United States Patent
Schneider et al.

(12)

(10) Patent No.: US 12,415,488 B2
(45) Date of Patent: Sep. 16, 2025

(54) DYNAMIC BRAKING TORQUE SPLIT FOR OPTIMAL THERMAL MANAGEMENT

(71) Applicant: Caterpillar Global Mining Equipment LLC, Denison, TX (US)

(72) Inventors: Karl P Schneider, Decatur, IL (US); Joel Skalet, Chillicothe, IL (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 296 days.

(21) Appl. No.: 18/203,490

(22) Filed: May 30, 2023

(65) Prior Publication Data

US 2024/0400015 A1 Dec. 5, 2024

(51) Int. Cl.
| | |
|---|---|
| B60T 8/26 | (2006.01) |
| B60T 8/171 | (2006.01) |
| B60T 8/172 | (2006.01) |
| B60T 8/1766 | (2006.01) |
| B60T 8/58 | (2006.01) |
| B60T 17/22 | (2006.01) |
| F16D 66/00 | (2006.01) |

(52) U.S. Cl.
CPC ............ *B60T 8/26* (2013.01); *B60T 8/171* (2013.01); *B60T 8/172* (2013.01); *B60T 8/1766* (2013.01); *B60T 8/58* (2013.01); *B60T 17/22* (2013.01); *B60T 2250/04* (2013.01); *F16D 2066/001* (2013.01); *F16D 2066/005* (2013.01)

(58) Field of Classification Search
CPC ........ B60T 8/171; B60T 8/172; B60T 8/1766; B60T 8/26; B60T 8/58; B60T 17/22; B60T 2250/04; F16D 2066/001; F16D 2066/005
See application file for complete search history.

(56) References Cited

U.S. PATENT DOCUMENTS

| | | | |
|---|---|---|---|
| 6,719,379 | B2 | 4/2004 | Crombrez |
| 7,694,555 | B2 | 4/2010 | Howell et al. |
| 10,752,288 | B2 | 8/2020 | Chennupalli et al. |
| 11,590,848 | B2 | 2/2023 | Carbone et al. |
| 11,597,283 | B2 | 3/2023 | Suzuki et al. |
| 2002/0030408 | A1* | 3/2002 | Niwa ............... B60K 17/354 903/918 |
| 2003/0234577 | A1* | 12/2003 | Crombez ............ B60W 10/18 303/156 |
| 2005/0137060 | A1* | 6/2005 | Kuras .............. B60L 7/22 477/214 |

(Continued)

FOREIGN PATENT DOCUMENTS

CN 105292092 B 12/2017

*Primary Examiner* — John M Zaleskas (57) ABSTRACT

Typically, mobile equipment with axles has a mechanically fixed or constant split ratio for the braking torque that is applied to each axle. Disclosed embodiments dynamically adjust the braking torque ratio between axles based on real-time parameter values, such as requested braking power and a real-time brake state parameter (e.g., brake temperatures), to more evenly distribute wear or other health imbalances across the brake systems of mobile equipment. Accordingly, disclosed embodiments may extend the longevity of brake systems, reduce the costs of maintenance of mobile equipment, facilitate a more cost-effective brake system that balances health or durability with performance under different operating scenarios, and/or the like.

20 Claims, 5 Drawing Sheets

(56) References Cited

U.S. PATENT DOCUMENTS

| | | | |
|---|---|---|---|
| 2008/0100129 A1* | 5/2008 | Lubbers | B60L 7/18 |
| | | | 303/113.1 |
| 2008/0236269 A1* | 10/2008 | Howell | B60T 17/221 |
| | | | 73/121 |
| 2009/0326770 A1* | 12/2009 | O'Neil | B60T 7/12 |
| | | | 477/118 |
| 2015/0328992 A1* | 11/2015 | Amaravadi | B60L 7/22 |
| | | | 701/70 |
| 2017/0057476 A1* | 3/2017 | Schwartz | B60T 8/172 |
| 2019/0211529 A1* | 7/2019 | Vigholm | B60T 8/36 |
| 2019/0299949 A1* | 10/2019 | Ying | B60T 8/1761 |
| 2019/0322316 A1* | 10/2019 | Chennupalli | B60K 6/547 |
| 2019/0337391 A1* | 11/2019 | Crombez | B60W 30/18127 |
| 2020/0189398 A1* | 6/2020 | Suzuki | B60T 8/1766 |
| 2021/0114464 A1* | 4/2021 | Carbone | B60L 7/26 |
| 2021/0354671 A1* | 11/2021 | Cho | B60T 8/26 |
| 2023/0026361 A1* | 1/2023 | Subramanian | B60T 8/171 |

\* cited by examiner

| Front Torque (%) | | Braking Power (kW) | | | | | | | | |
|---|---|---|---|---|---|---|---|---|---|---|
| | | 0 | 500 | 1000 | 1500 | 2000 | 2500 | 3000 | 3500 | 4000 |
| Brake Temperature Differential between Front and Rear (C) | 10 | 10 | 15 | 20 | 25 | 30 | 35 | 40 | 40 | 40 |
| | 5 | 15 | 20 | 25 | 30 | 35 | 40 | 40 | 40 | 40 |
| | 0 | 20 | 25 | 30 | 35 | 40 | 40 | 40 | 40 | 40 |
| | -5 | 25 | 30 | 35 | 40 | 40 | 40 | 40 | 40 | 40 |
| | -10 | 30 | 35 | 40 | 40 | 40 | 40 | 40 | 40 | 40 |

# DYNAMIC BRAKING TORQUE SPLIT FOR OPTIMAL THERMAL MANAGEMENT

TECHNICAL FIELD

The embodiments described herein are generally directed to braking, and, more particularly, to dynamically splitting braking torque between axles for optimal thermal management.

BACKGROUND

Typically, mobile equipment with axles has a mechanically fixed or constant split ratio for the braking torque that is applied to each axle. Some mobile equipment has advanced features, such as traction control, load-state-based changes, and variable cooling flow split. However, these advanced features are not determined dynamically based on the severity of the braking scenario. In addition, in mobile equipment that employs electric braking, it would be advantageous to reduce the otherwise redundant, oil-cooled brake system, in order to decrease cost, weight, and complexity. This is especially true if the mobile equipment has multiple brake systems, and the brake system of interest is not used as a long-duration, high-energy system, such that transient performance properties are of interest.

U.S. Pat. No. 11,597,283, Chinese Patent No. CN105292092B, and U.S. Patent Pub. No. 2019/0337391 describe systems related to determining how to split braking torque between axles. The present disclosure is directed toward overcoming one or more of the problems discovered by the inventors.

SUMMARY

In an embodiment, a method comprises, by a controller in a mobile equipment that comprises at least two axles that each have at least one braking system, in each of one or more iterations: determining braking torque based on a requested braking from a brake interface; determining braking power based on the determined braking torque and a speed of the mobile equipment; determining a split of the braking torque between the at least two axles based on the braking power and brake state parameters of the at least one braking system on each of the at least two axles; allocating the braking torque between the at least two axles based on the split; and controlling the at least one braking system for each of the at least two axles based on the allocated braking torque.

In an embodiment, a controller, for a mobile equipment that comprises at least two axles that each have at least one braking system, comprises: at least one hardware processor; and software that is configured to, when executed by the at least one hardware processor, in each of one or more iterations, determine braking torque based on a requested braking from a brake interface, determine braking power based on the determined braking torque and a speed of the mobile equipment, determine a split of the braking torque between the at least two axles based on the braking power and brake state parameters of the at least one braking system on each of the at least two axles, allocate the braking torque between the at least two axles based on the split, and control the at least one braking system for each of the at least two axles based on the allocated braking torque.

In an embodiment, a method comprises, by a controller in a mobile equipment that comprises at least two axles that each have at least one braking system, in each of a plurality of iterations: determining braking torque based on a requested braking from a brake interface; determining braking power based on the determined braking torque and a speed of the mobile equipment; determining a split of the braking torque between the at least two axles based on the braking power and brake state parameters of the at least one braking system on each of the at least two axles; adjusting the split based on braking control performed by another system; stabilizing the split when a rate of change in the split with respect to one or more prior ones of the plurality of iterations would violate a constraint; allocating the braking torque between the at least two axles based on the split; and controlling the at least one braking system for each of the at least two axles based on the allocated braking torque.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description. In addition, for clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

Figure 1:
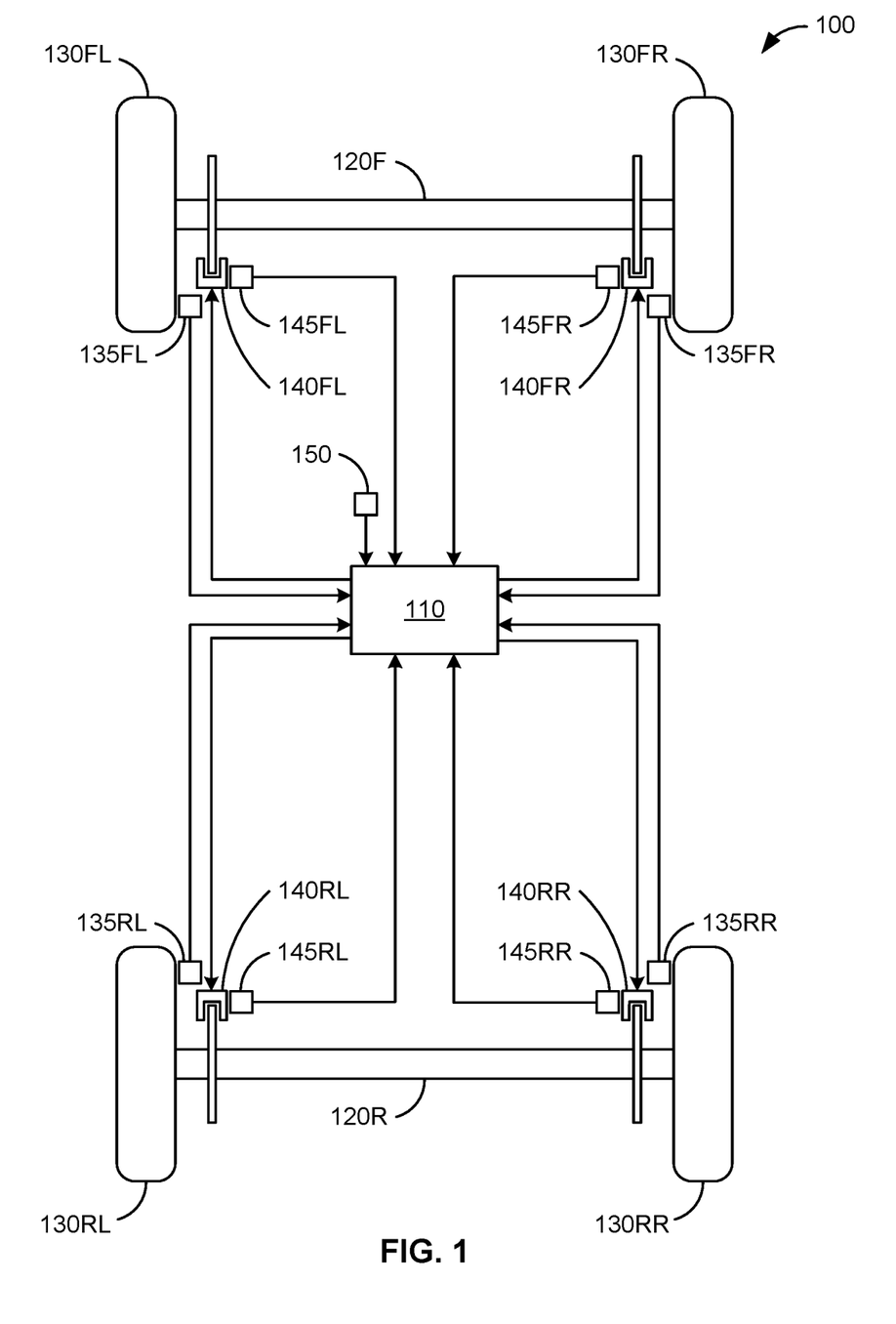
FIG. 1 illustrates a schematic diagram of mobile equipment, according to an embodiment.

FIG. 1 illustrates a schematic diagram of mobile equipment 100, according to an embodiment. Mobile equipment 100 may be any machine with at least two axles and at least one braking system on each of the two axles. Examples of mobile equipment 100 include, without limitation, a wheel loader, dump truck, cold planer, motor grader, road reclaimer, telehandler, tractor-scraper, or the like, as well as ordinary road vehicles (e.g., automobiles, semi-tractors, etc.) and any vehicle with two or more axles that is manufactured by or for Caterpillar Inc. of Irving, Texas, or any of its affiliates or competitors.

As illustrated, mobile equipment 100 comprises a controller 110, as well as a front axle 120F and rear axle 120R. Controller 110 may be one or more electronic control units (ECUs). Controller 110 may be configured to perform only the functions described herein, or may be configured to perform additional functions to those described herein, and may be configured to interact with other controllers onboard mobile equipment 100 (e.g., other electronic control units).

As used herein, a reference numeral with an appended letter or letters will be used to refer to a specific component, whereas the same reference numeral without any appended letters will be used to refer collectively to a plurality of the component or to refer to a generic or arbitrary instance of the component. Thus, for example, the term "axles 120" refers collectively to front axle 120F and rear axle 120R, and the term "axle 120" may refer to either front axle 120F or rear axle 120R.

Each axle 120 comprises at least two wheels 130 on opposing ends of the axle 120. For example, front axle 120F comprises a front left wheel 130FL and a front right wheel 130FR. Similarly, rear axle 120R comprises a rear left wheel 130RL and a rear right wheel 130RR.

Each wheel 130 may comprise a wheel sensor 135 that measures one or more parameters of the respective wheel 130. For example, front left wheel sensor 135FL measures parameter(s) of front left wheel 130FL, front right wheel sensor 135FR measures parameter(s) of front right wheel 130FR, rear left wheel sensor 135RL measures parameter(s) of rear left wheel 130RL, and rear right wheel sensor 135RR measures parameter(s) of rear right wheel 130RR. Each wheel sensor 135 outputs a signal representing the value of each parameter to controller 110. The parameter(s) measured by each wheel sensor 135 may comprise wheel speed, ground speed, or the like.

Each wheel 130 may be associated with a respective braking system 140 that applies braking to the respective wheel 130. For example, front left braking system 140FL applies braking to front left wheel 130FL, front right braking system 140FR applies braking to front right wheel 130FR, rear left braking system 140RL applies braking to rear left wheel 130RL, and rear right braking system 140RR applies braking to rear right wheel 130RR. Braking systems 140 may comprise any suitable type of brakes, including, without limitation, disc brakes, drum brakes, or the like. Each braking system 140 may be controlled by controller 110. In particular, controller 110 may control the pressure that is applied by front brakes 140FL and 140FR and rear brakes 140RL and 140RR, according to an allocation of braking torque to front axle 120F and rear axle 120R.

Each braking system 140 may comprise a brake sensor 145 that measures one or more parameters of the respective braking system 140. For example, front left brake sensor 145FL measures parameter(s) of front left braking system 140FL, front right brake sensor 145FR measures parameter(s) of front right braking system 140FR, rear left brake sensor 145RL measures parameter(s) of rear left braking system 140RL, and rear right brake sensor 145RR measures parameter(s) of rear right braking system 140RR. Each brake sensor 145 outputs a signal representing the value of each parameter to controller 110. The parameter(s) measured by each brake sensor 145 may comprise a brake state parameter. The brake state parameter may be a temperature of the respective braking system 140, such as the temperature of oil in the respective braking system 140, the temperature at a cooling outlet of the respective braking system 140, the temperature of a physical component of the respective braking system 140 other than the oil, or the like. More generally, the brake state parameter may be any parameter that indicates or estimates a relative brake state that is representative of the current stress and/or lifecycle health of the respective braking system 140, and may be a physical measurement, a combination or composite of physical measurements, an estimated score, index, or other measurement output by an algorithm or physics-based model (e.g., that utilizes on one or more physical measurements as input), or the like. As an example, higher values of the brake state parameter (e.g., higher temperature values in the event that the brake state parameter includes temperature) may indicate higher stress or strain on brake systems 140 (e.g., due to thermal and/or mechanical loading) than lower values of the brake state parameter. In this case, the value of the brake state parameter may zero below an endurance limit threshold, and increase exponentially above the endurance limit threshold. The brake state parameter may be derived from a plurality of factors related to brake state, such that the total value is greater than the sum of the parts.

In addition to wheel sensors 135 and brake sensors 145, controller 110 may receive the output of a brake interface 150. Brake interface 150 may measure the position of a brake pedal, brake level, brake dial, or any other brake mechanism for requesting braking during the operation of mobile equipment 100. In cases in which mobile equipment 100 is operated locally (i.e., by a local operator, for example, in the cabin of or otherwise onboard mobile equipment 100), brake interface 150 may sense the requested braking from the brake mechanism (e.g., by a position of the brake mechanism) within the cabin of mobile equipment 100, as the local operator modulates or otherwise operates it. In cases in which mobile equipment 100 is operated remotely (i.e., by a remote operator offboard mobile equipment 100), brake interface 150 may by a remote interface that senses the requested braking from the brake mechanism (e.g., by a position of the brake mechanism) within a remote operating terminal, as the remote operator modulates or otherwise operates it, and transmits the requested braking to controller 110 over a wireless communication network. In cases in which mobile equipment 100 is operated autonomously (i.e., with no involvement by a human operator or with supervision by a human operator), the brake mechanism may be omitted or substituted, and the requested braking may be provided directly to controller 110 (e.g., by a separate autonomous driving system) or determined by controller 110 (e.g., if controller 110 implements the autonomous driving system), for example, based on a speed command. In cases in which mobile equipment 100 is operated semi-autonomously (e.g., with some involvement by a human operator), controller 110 may be configured to both receive the requested braking via brake interface 150 during human operation, and directly receive or determine requested braking during autonomous operation. In any case, the requested braking may be represented as an amount of brake torque, an amount of brake power, a target speed over a time interval (e.g., below a current speed), or other parameter from which an application of braking systems 140 can be derived.

Figure 2:
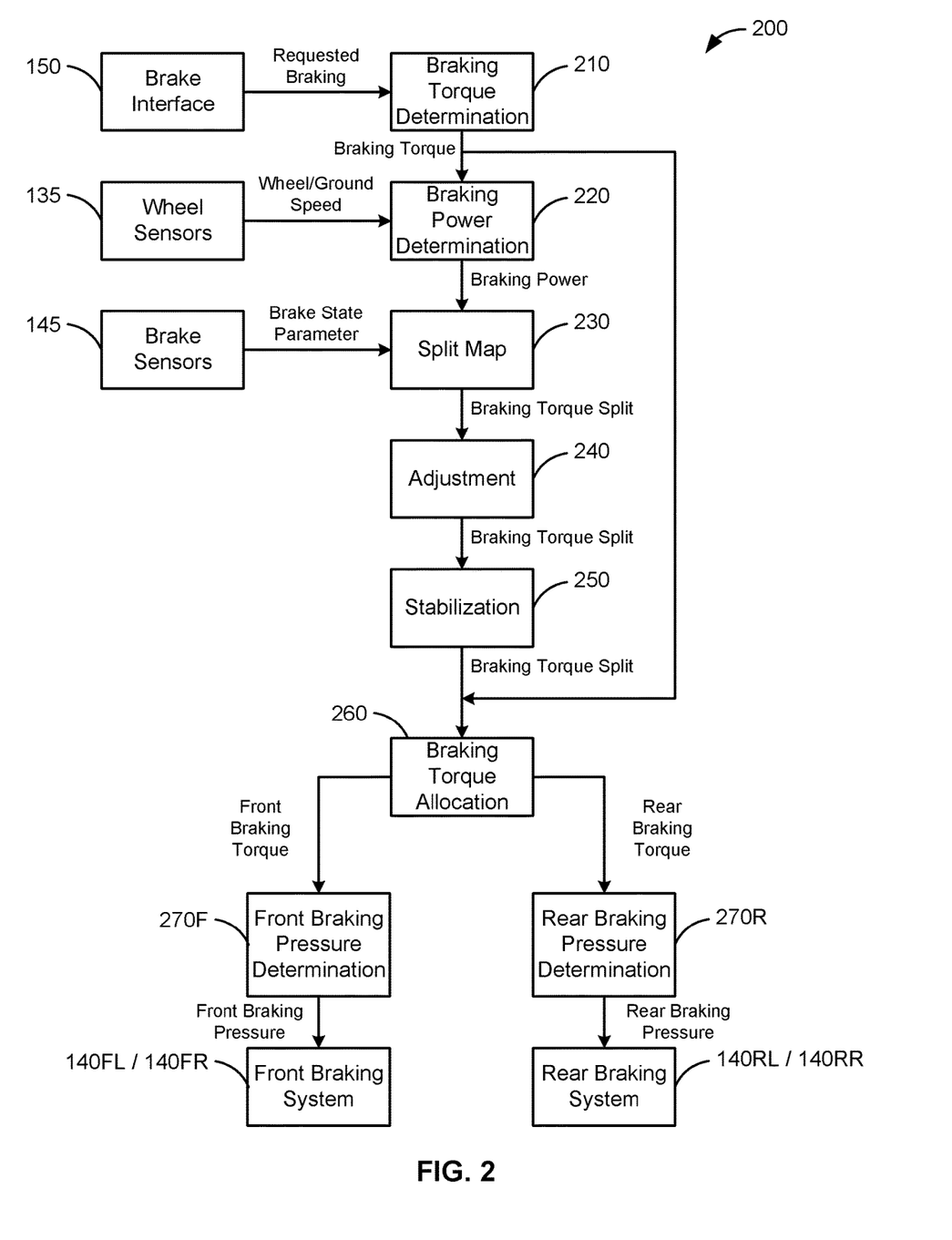
FIG. 2 illustrates a system for dynamically allocating brake torque between front and rear axles, according to an embodiment.

FIG. 2 illustrates a system 200 for dynamically allocating brake torque between front and rear axles 120, according to an embodiment. System 200 comprises a braking torque determination module 210, braking power determination module 220, split map 230, adjustment module 240, stabilization module 250, braking torque allocation module 260, front braking pressure determination module 270F, and rear braking pressure determination module 270R. System 200 may be implemented as one software module or a plurality of software modules that interact with each other (e.g., via inter-process or intra-process communications), and may be executed by a hardware processor of controller 110. Alternatively, system 200 could be implemented as one or more hardware modules, such as a specific-purpose processor, integrated circuit (IC), application-specific integrated circuit (ASIC), digital signal processor (DSP), field-programmable gate array (FPGA) or other programmable logic device, discrete gate or transistor logic, and/or the like. As another alternative, system 200 could be implemented as a combination of software and hardware modules. While system 200 is illustrated with a certain arrangement and ordering of modules, system 200 may be implemented with fewer, more, or different modules and a different arrangement and/or ordering of modules.

Braking torque determination module 210 is configured to receive the requested braking from brake interface 150 or an autonomous or semi-autonomous driving system. Braking torque determination module 210 is configured to convert the requested braking into the total value of braking torque to be applied to braking systems 140, and output this total value of braking torque. In the event that brake interface 150 outputs the requested braking as a position of a torque brake mechanism (e.g., a torque pedal), the total value of braking torque may be calculated as a product or other function of the position and the maximum braking torque value. In the event that brake interface 150 outputs the requested braking as a position of a power brake mechanism (e.g., a power pedal), the total value of braking torque may be calculated as the product of the position and the maximum braking power value, divided by wheel speed, or according to some other function.

Braking power determination module 220 is configured to receive the wheel or ground speed from wheel sensors 135 and the braking torque that is output from braking torque determination module 210. Braking power determination module 220 converts the wheel or ground speed and the braking torque into a value of braking power, and outputs this value of braking power. The braking power is the potential and kinetic energy that must be removed by mobile equipment 100 per unit time to achieve the determined braking torque.

The braking power, output by braking power determination module 220, and the brake state parameters (e.g., brake temperatures, or other proxy of brake health or stress), output by brake sensors 145, may be used as indices into split map 230, in order to determine the braking torque split. The braking power may be expressed in kilowatts (KW). The brake state parameters may be expressed as a differential between the brake state parameter of the front braking systems (i.e., 140FL and 140FR) and the brake state parameter of the rear braking systems (i.e., 140RL and 140RR). For example, in an embodiment in which the brake state parameter comprises a brake temperature, the brake temperatures may be expressed as a temperature differential between the temperature of the front braking systems (i.e., 140FL and 140FR) and the temperature of the rear braking systems (i.e., 140RL and 140RR). The brake state parameter (e.g., temperature) of the front braking systems may be the average of the front braking systems 140FL and 140FR, as acquired by brake sensors 145FL and 145FR, respectively. Similarly, the brake state parameter (e.g., temperature) of the rear braking systems may be the average of the rear braking systems 140RL and 140RR, as acquired by brake sensors 145RL and 145RR. The brake state differential (e.g., temperature differential, expressed in degrees of Celsius or Fahrenheit) may be calculated by subtracting the brake state parameter (e.g., temperature) of the rear braking systems from the brake state parameter (e.g., temperature) of the front braking systems.

In an embodiment, the brake state differential may be intentionally biased, such that the amount of wear is not distributed evenly between axles 120. This may be useful in cases in which one axle 120 has less wear than the other axle 120 (e.g., prior to implementing the disclosed embodiments), or in which one axle 120 is easier to replace (e.g., more accessible, less costly, etc.) than the other axle 120. In this case, more wear may be distributed to the axle 120 with less wear (e.g., at least until the wear is more evenly distributed) or that is easier to replace, than to the axle 120 with more wear or that is more difficult to replace.

Split map 230 may comprise or represent a two-dimensional lookup table that determines the braking torque split associated with the input value of braking power and the input value of the brake state parameter (e.g., temperature differential). If an input value of braking power and/or an input value of the brake state parameter are not specifically represented in the lookup table, the braking torque split may be interpolated (e.g., linearly interpolated) based on values of braking power and/or the brake state parameter that are in the lookup table. Alternatively, instead of a lookup table, split map 230 may comprise an algorithm that calculates the braking torque split using the values of braking power and brake state parameter as inputs.

Adjustment module 240 is configured to receive the braking torque split, output by split map 230, and apply any overrides or other adjustments to the braking torque split output. These adjustments may be responsive to another system, which may perform advanced braking control and which may be onboard mobile equipment 100 or offboard mobile equipment 100. For example, the other system may implement automatic speed control (e.g., to maintain a set speed), perform automatic braking when an object is detected (e.g., to avoid a collision), respond to offboard requests (e.g., to maintain speed, decelerate, accelerate, etc., to anticipate a required power, to maintain a particular parameter for a particular duration, etc.), and/or the like. In this case, the determination of this other system, regarding the braking torque split or other parameter that affects the braking torque split, may override or otherwise cause an adjustment to the braking torque split determined by split map 230. Since the severity and duration of braking is known in advance, the actions by the other system can be more precise, whereas future input by an operator is unknown. For example, the brake torque split may be adjusted based on braking control performed by this other system. Such an embodiment is appropriate when unhindered operation of the other system is more important or appropriate, in the moment, than the health of braking systems 140. For instance, when one axle 120 loses traction and begins sliding, the other system may allocate more braking torque to the other axle 120 in order to maintain control. This traction control should override split map 230, since maintaining traction is more important than the health of brake systems 140 in the moment. In an alternative embodiment, adjustment module 240 may be omitted. It should be understood that, even in embodiments which include adjustment module 240, adjustment module 240 may not always adjust the braking torque split. Rather, adjustment module 240 will only adjust the braking torque split when dictated by the other system.

Stabilization module 250 is configured to receive the braking torque split, output by split map 230 and potentially adjusted by adjustment module 240, and stabilize the braking torque split by limiting the rate of change in the value of the braking torque split, with respect to previously determined brake torque splits, such that the rate of change does not violate a constraint (e.g., by constraining the rate of change to below a threshold value). In other words, stabilization module 250 prevents the braking torque split from bouncing between different values over a short period of time. In an embodiment, stabilization module 250 implements proportional-integral-derivative (PID) control, which employs feedback to gradually correct the error between the requested value of the braking torque split and the actual value of the braking torque split. In an alternative embodiment, stabilization module 250 may be omitted.

Braking torque allocation module 260 is configured to receive the braking torque, output by braking torque determination module 210, and the braking torque split, output by stabilization module 250. Braking torque allocation module 260 allocates the braking torque between the front and rear braking systems 140 according to the braking torque split. For example, if the braking torque split is 40%, then 40% of the braking torque, output by braking torque determination module 210, is allocated to the front braking systems 140FL and 140FR, and 60% of the braking torque, output by braking torque determination module 210, is allocated to the rear braking systems 140RL and 140RR.

Braking torque allocation module 260 outputs the front braking torque to front braking pressure determination module 270F, and outputs the rear braking torque to rear braking pressure determination module 270R. Each braking pressure determination module 270 converts the received braking torque into a braking pressure, and outputs the braking pressure to the respective braking systems 140. For example, front braking pressure determination module 270F outputs the front braking pressure to front braking systems 140FL and 140FR, and rear braking pressure determination module 270R outputs the rear braking pressure to rear braking systems 140RL and 140RR. Each respective braking system 140 then applies the received braking pressure to the respective wheel 130.

Figure 3:
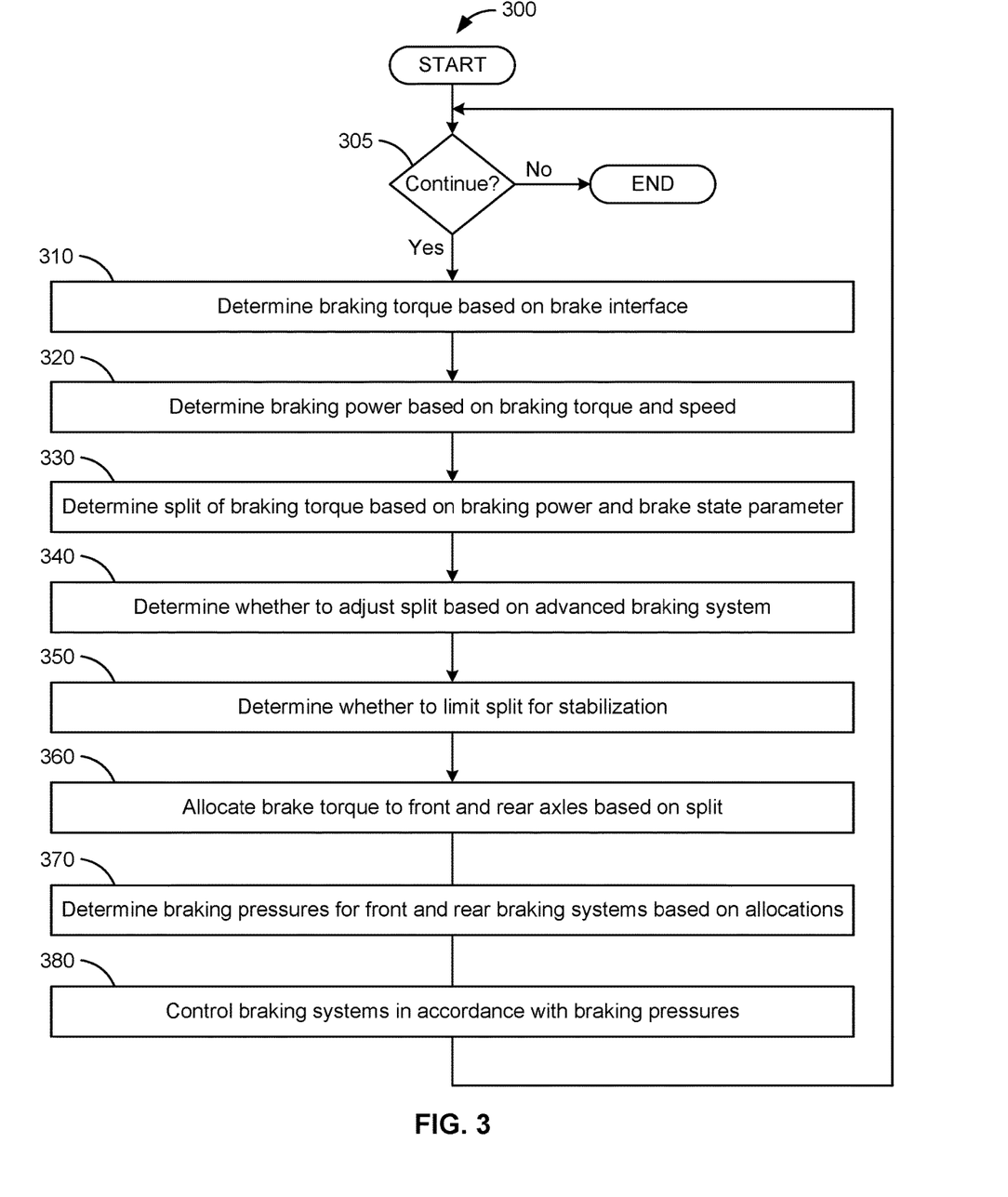
FIG. 3 illustrates a process for dynamically allocating brake torque between front and rear axles, according to an embodiment.

FIG. 3 illustrates a process 300 for dynamically allocating brake torque between front and rear axles 120, according to an embodiment. It should be understood that process 300 may be implemented using system 200. Process 300 may be executed over a plurality of iterations, for example, starting from when system 200 is activated (e.g., when mobile equipment 100 is turned on) and ending when system 200 is deactivated (e.g., when mobile equipment 100 is turned off). Process 300 may be executed in real time as mobile equipment 100 is operating. As used herein, the terms "real time" or "real-time" encompass both a response that occurs simultaneously with an input event, as well as a response that occurs some time after the input event due to ordinary latencies inherent in processing, communications, and/or the like.

While process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 305, process 300 determines whether or not to continue. For example, process 300 may continue for as long as system 200 is active. System 200 may be configured to be enabled and disabled at the discretion of a human operator (e.g., via a button or other input in the cabin of mobile equipment 100 and/or at a remote terminal) and/or autonomous driving system (e.g., via a control signal), and/or may be automatically enabled when mobile equipment 100 is turned on and remain active until mobile equipment 100 is turned off or system 200 is disabled. Thus, system 200 can be activated or deactivated as needed or desired. When determining that process 300 is to continue (i.e., "Yes" in subprocess 305), process 300 proceeds to subprocess 310. Otherwise, when determining that process 300 is not to continue (i.e., "No" in subprocess 305), process 300 ends.

In subprocess 310, the braking torque is determined based on the requested braking from brake interface 150, as acquired in real time. Subprocess 310 may be implemented by braking torque determination module 210. Therefore, any description of braking torque determination module 210 applies equally to subprocess 310, and vice versa.

In subprocess 320, the braking power is determined based on the braking torque, determined in subprocess 310, and the wheel or ground speed (e.g., acquired from wheel sensors 135 in real time) of mobile equipment 100. Subprocess 320 may be implemented by braking power determination module 220. Therefore, any description of braking power determination module 220 applies equally to subprocess 320, and vice versa.

In subprocess 330, the optimal split of braking torque between front and rear braking systems 140 is determined based on the braking power, determined in subprocess 320, and the brake state parameter (e.g., determined from the output of brake sensors 145, acquired in real time). Subprocess 330 may be implemented by split map 230. Therefore, any description of split map 230 applies equally to subprocess 330, and vice versa.

In subprocess 340, the braking torque split, determined in subprocess 330, may be adjusted based on the operation of another braking control system. Subprocess 340 may be implemented by adjustment module 240. Therefore, any description of adjustment module 240 applies equally to subprocess 340, and vice versa. In an alternative embodiment, subprocess 340 may be omitted.

In subprocess 350, the braking torque split, determined in subprocess 330 and potentially adjusted in subprocess 340, may be limited for stabilization. Subprocess 350 may be implemented by stabilization module 250. Therefore, any description of stabilization module 250 applies equally to subprocess 350, and vice versa. In an alternative embodiment, subprocess 350 may be omitted.

In subprocess 360, the braking torque, determined in subprocess 310, is allocated between front axle 120F and rear axle 120R based on the braking torque split, output by subprocess 350 and/or input to subprocess 360. Subprocess 360 may be implemented by braking torque allocation module 260. Therefore, any description of braking torque allocation module 260 applies equally to subprocess 360, and vice versa.

In subprocess 370, the front braking pressure for front braking systems 140FL and 140FR and the rear braking pressure for rear braking systems 140RL and 140RR are determined based on the allocations, determined in subprocess 360. Subprocess 370 may be implemented by braking pressure determination modules 270. Therefore, any description of front braking pressure determination module 270F and/or rear braking determination module 270R applies equally to subprocess 370, and vice versa.

In subprocess 380, braking systems 140 are controlled in accordance with the braking pressures determined in subprocess 370. For example, controller 110 may apply the front braking pressure, determined in subprocess 370, to front braking systems 140FL and 140FR. Similarly, controller 110 may apply the rear braking pressure, determined in subprocess 370, to rear braking systems 140RL and 140RR.

Figure 4:
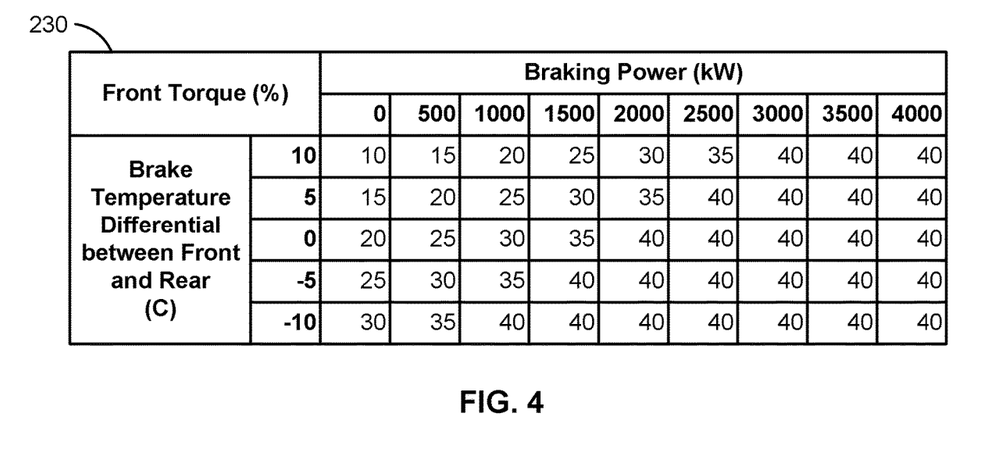
FIG. 4 illustrates an example of a split map, according to an embodiment.

FIG. 4 illustrates an example of a split map 230, according to an embodiment. In this example, each row represents a value of the temperature differential between front and rear braking systems 140, and each column represents a value of braking power. While the brake temperature differential is used to represent the brake state parameter in this example, the brake state parameter, including a brake state parameter that comprises a temperature, could be represented in an alternative manner. For example, actual brake temperatures often lag and may not be completely indicative of brake stress. Thus, in an alternative embodiment, a proxy, such as a thermal estimator (e.g., generated by an algorithm or physics-based model based on one or more physical measurements, such as current brake temperatures), could be used as the brake state parameter for split map 230. More generally, any parameter indicative of the state of braking systems 140 may be used as an input, in place of the brake temperature differential, to split map 230.

In the illustrated example, the value in each cell in split map 230 represents the percentage of braking torque that should be allocated to front braking systems 140FL and 140FR for a given pairing of braking power and brake state parameter. It should be understood that the remaining percentage of braking torque should be allocated to rear braking systems 140RL and 140RR. Thus, for example, at a brake temperature differential value of −5° C. (e.g., determined from brake sensors 145) and a braking power of 500 kW (e.g., determined by braking power determination module 220 in subprocess 320), 40% of the braking torque (e.g., determined by braking torque determination module 210 in subprocess 310) may be allocated to front braking systems 140FL and 140FR, and 60% of the braking torque may be allocated to rear braking systems 140RL and 140RR.

Allocation values for pairings of braking power and the brake state parameter that are not explicitly represented in split map 230 may be interpolated. For example, at a brake temperature differential value of 10° C. and a braking power of 250 KW, the value of the braking torque split may be linearly interpolated as 12.5%.

As mentioned above, split map 230 could alternatively be implemented as an algorithm, instead of a lookup table. In either case, split map 230 may comprise any number of dimensions, including one dimension or more than the two illustrated dimensions. In addition, split map 230 could comprise a different set of dimensions than those illustrated. For example, other parameters may be used instead of, or in addition to, braking power and/or brake temperature differential. In particular, as mentioned above, the brake temperature differential may be replaced with one or more other parameters/dimensions indicative of the relative state of braking systems 140. As mentioned previously, split map 230 may be intentionally biased to distribute more braking torque—and therefore, more wear—to one axle 120 than the other axle 120, for example, as a means to balance the state of health of previously unbalanced brake systems 140 over time, or to create and/or maintain an imbalance in the state of health that increases the relative wear to an axle 120 that is easier to replace.

Split map 230 may be determined initially using a simulation with a digital twin of mobile equipment 100. In particular, the braking torque split may be optimized across all possible or feasible values in each dimension (e.g., braking power and brake state parameter). These optimal braking torque splits may then be represented in split map 230, which may be loaded into memory of controller 110.

The optimal braking torque split for each combination of dimension values represents the braking torque split that evenly distributes damage across all braking systems 140 in the scenario represented by that combination of dimension values, such that braking systems 140 wear evenly over time. In an embodiment, split map 230 may contain non-linear transitions between braking torque splits.

Notably, the initial split map 230 may not be ideally balanced for a particular mobile equipment 100, especially if brake temperature is used as the brake state parameter, since the brake temperature is a lagging indicator. However, split map 230 may still provide a suitable braking torque split at the start of a braking event. Even in the event that the brake state parameter is a lagging indicator such as temperature, the values of the brake state parameter from brake sensors 145 will eventually catch up, such that the braking torque split can be fine-tuned over the remainder of the braking event.

In an embodiment, the initial split map 230, determined via simulation, may be adjusted over time using feedback from operation of the actual mobile equipment 100. For example, controller 110 may continually (e.g., in real time or periodically) assess real-time feedback from onboard sensors (e.g., brake sensors 145) to determine how well the current split map 230 is performing in terms of the objective (e.g., evenly distributing brake wear, temperature, or other health imbalances across axles 120). If the current split map 230 is underperforming, controller 110 may adjust split map 230 (e.g., adjust the braking torque split values in split map 230 for one or more combinations of dimensions) to improve performance. Controller 110 may modify split map 230 directly, or may adjust an offset value that is applied to the values of the braking torque split that are output by split map 230. Thus, split map 230 can evolve over time to account for the actual operating conditions of mobile equipment 100. In this case, the split map 230 for two different mobile equipment 100 of the same model may start out identical but begin to differ over time.

Figure 5:
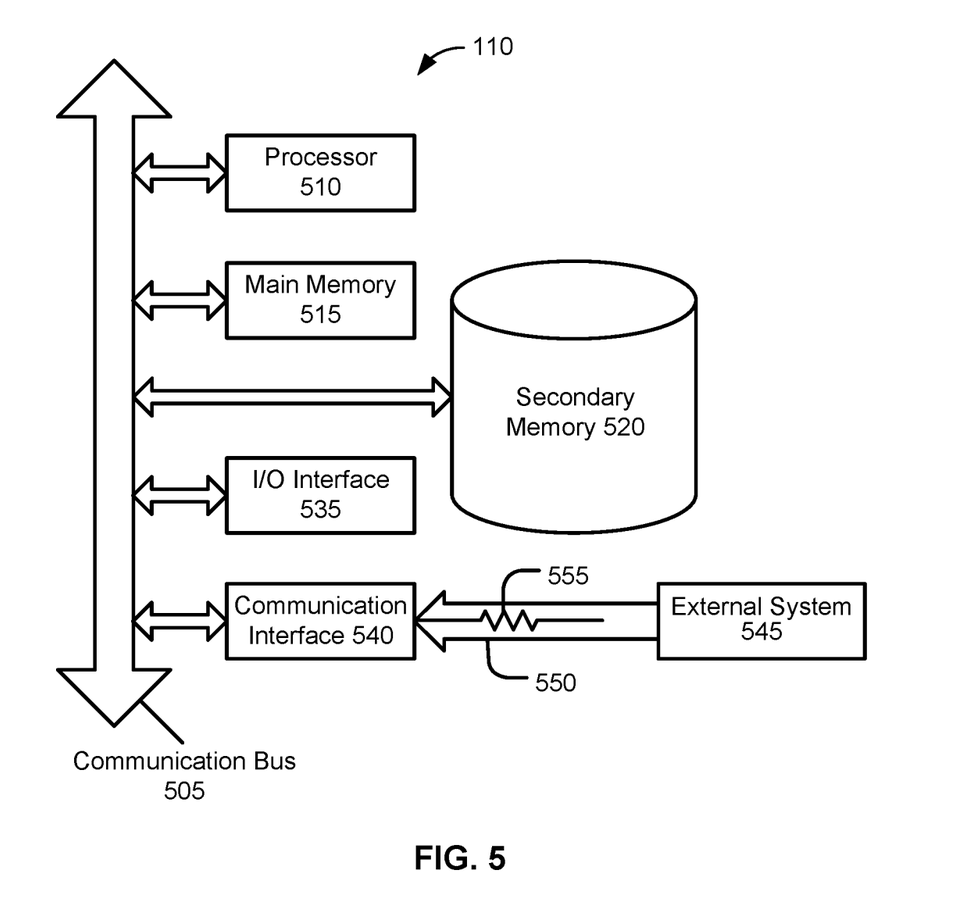
FIG. 5 illustrates a block diagram of an example controller, according to an embodiment.

FIG. 5 illustrates a block diagram of an example controller 110, according to an embodiment. Controller 110 may implement process 300, for example, by executing the modules of system 200. In this embodiment of controller 110, system 200 is implemented as computer-executable software modules.

Controller 110 may comprise one or more processors 510. Processor(s) 510 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 510. Examples of processors which may be used with controller 110 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 510 may be connected to a communication bus 505. Communication bus 505 may include a data channel for facilitating information transfer between storage and other peripheral components of controller 110. Furthermore, communication bus 505 may provide a set of signals used for communication with processor 510, including a data bus, address bus, and/or control bus (not shown). Communication bus 505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Controller 110 may comprise main memory 515. Main memory 515 provides storage of instructions and/or other data for software executing on processor 510, such as modules 210-270 of system 200. It should be understood that instructions stored in the memory and executed by processor 510 may be written and/or compiled according to any suitable language, including without limitation C/C++, Java, JavaScript, Perl, Python, Visual Basic, .NET, and the like. Main memory 515 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Controller 110 may comprise secondary memory 520. Secondary memory 520 is a non-transitory computer-readable medium having instructions and/or other data for software, such as modules 210-270 of controller 110, stored thereon. In this description, the term "computer-readable medium" is used to refer to any non-transitory computer-readable storage media used to provide computer-executable code and/or other data to or within controller 110. The computer software stored on secondary memory 520 is read into main memory 515 for execution by processor 510. Secondary memory 520 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Controller 110 may comprise an input/output (I/O) interface 535. I/O interface 535 provides an interface between one or more components of controller 110 and one or more input and/or output devices. For example, I/O interface 535 may receive the output of one or more sensors (e.g., wheel sensors 135, brake sensors 145, pedal sensor 150, etc.), and/or output control signals to one or more components of mobile equipment 100 (e.g., braking systems 140).

Controller 110 may comprise a communication interface 540. Communication interface 540 allows software to be transferred between controller 110 and external devices, networks, or other information sources. For example, instructions and/or other data may be transferred to controller 110, over one or more networks, from a network server via communication interface 540. Examples of communication interface 540 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing controller 110 with a network or another computing device. Communication interface 540 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 540 is generally in the form of electrical communication signals 555. These signals 555 may be provided to communication interface 540 via a communication channel 550 between communication interface 540 and an external system 545. In an embodiment, communication channel 550 may be a wired or wireless network, or any variety of other communication links. Communication channel 550 carries signals 555 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 515 and/or secondary memory 520. Computer-executable code can also be received from an external system 545 via communication interface 540 and stored in main memory 515 and/or secondary memory 520. Such computer-executable code, when executed by processor(s) 510, enable controller 110 to perform the various functions of the disclosed embodiments.

INDUSTRIAL APPLICABILITY

Typically, mobile equipment with axles has a mechanically fixed or constant split ratio for the braking torque that is applied to each axle. Disclosed embodiments dynamically adjust the braking torque ratio between axles 120 based on real-time parameter values, such as requested braking power and a real-time brake state parameter (e.g., brake temperatures), to more evenly distribute wear or other health imbalances across brake systems 140 of mobile equipment 100. Accordingly, disclosed embodiments may extend the longevity of brake systems 140, reduce the costs and frequency of maintenance of mobile equipment 100, and/or the like.

Furthermore, disclosed embodiments enable a reduction in redundant oil-cooled brake systems 140, especially in scenarios in which brake systems 140 are not used as long-duration high-energy systems. In particular, there are two bounding load case scenario extremes. At the first extreme, a braking event occurs with high power and short duration (i.e., low energy). The inventors have recognized that, in this case, the thermal mass of the system is the dominant factor. Therefore, the braking torque should be split in proportion to the combination of the energy dissipation capabilities of the thermal mass and the oil cooling flow to brake systems 140. At the second extreme, a downhill braking event occurs at fixed speed with low power and long duration (i.e., high energy). The inventors have recognized that, in this case, the thermal mass of the system is not a relevant factor. Therefore, the braking torque should be split in proportion to just the oil cooling flow to brake systems 140. Accordingly, split map 230 splits the braking torque differently along the spectrum between these two extremes to achieve the optimal split based on the real-time physical properties of mobile equipment 100.

In addition, between these two extremes, the transition between splits in split map 230 may be non-linear. Thus, offboard simulations may be run to develop an initial split map 230 that is based on actual conditions and which has non-linear transitions between splits.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of mobile equipment. Hence, although the present embodiments are, for convenience of explanation, depicted and described as being implemented in a two-axle mobile equipment, it will be appreciated that it can be implemented in mobile equipment with a different number of axles and various other types of machines with brakes, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A method comprising, by a controller in a mobile equipment that comprises at least two axles that each have at least one braking system, in each of one or more iterations:
    determining braking torque based on a requested braking from a brake interface;
    determining braking power based on the determined braking torque and a speed of the mobile equipment;
    determining a split of the braking torque between the at least two axles based on the braking power and brake state parameters of the at least one braking system on each of the at least two axles;
    allocating the braking torque between the at least two axles based on the split; and
    controlling the at least one braking system for each of the at least two axles based on the allocated braking torque.

2. The method of claim 1, further comprising, by the controller, in each of the one or more iterations, adjusting the split based on braking control performed by another system.

3. The method of claim 1, wherein the one or more iterations are a plurality of iterations, and wherein the method further comprises, by the controller, in at least one of the plurality of iterations, constraining a rate of change in a value of the split with respect to one or more prior ones of the plurality of iterations.

4. The method of claim 1, wherein controlling the at least one braking system on each of the at least two axles based on the allocated braking torque comprises:
    determining a first brake pressure based on the allocated braking torque for a first one of the at least two axles;
    determining a second brake pressure based on the allocated braking torque for a second one of the at least two axles;
    controlling the at least one braking system for the first axle based on the first brake pressure; and
    controlling the at least one braking system for the second axle based on the second brake pressure.

5. The method of claim 1, wherein the at least two axles comprise a front axle and a rear axle.

6. The method of claim 5, wherein each of the front axle and the rear axle comprises two wheels, wherein the mobile equipment comprises a braking system on each of the two wheels on each of the front and rear axles, and wherein controlling the at least one braking system for each of the at least two axles comprises controlling the braking system on each of the two wheels on each of the front and rear axles.

7. The method of claim 1, wherein determining the split of the braking torque between the at least two axles comprises looking up a value of the split in a split map using the braking power and the brake state parameters as inputs.

8. The method of claim 7, wherein the brake state parameters are represented in the inputs as a single differential between a first brake state parameter of the at least one braking system on a first one of the at least two axles and a second brake state parameter of the at least one braking system on a second one of the at least two axles.

9. The method of claim 8, wherein each of the first brake state parameter and the second brake state parameter is a brake temperature.

10. The method of claim 7, further comprising, by the controller, updating the split map based on real-time feedback from one or more onboard sensors of the mobile equipment.

11. The method of claim 1, wherein determining the split of the braking torque between the at least two axles comprises calculating a value of the split using an algorithm with the braking power and brake state parameters as inputs to the algorithm.

12. The method of claim 11, wherein the brake state parameters are represented in the inputs as a single differential between a first brake state parameter of the at least one braking system on a first one of the at least two axles and a second brake state parameter of the at least one braking system on a second one of the at least two axles.

13. The method of claim 12, wherein each of the first brake state parameter and the second brake state parameter is a brake temperature.

14. The method of claim 11, further comprising, by the controller, updating the algorithm based on real-time feedback from one or more onboard sensors of the mobile equipment.

15. A controller for a mobile equipment that comprises at least two axles that each have at least one braking system, the controller comprising:
    at least one hardware processor; and
    software that is configured to, when executed by the at least one hardware processor, in each of one or more iterations,
        determine braking torque based on a requested braking from a brake interface,
        determine braking power based on the determined braking torque and a speed of the mobile equipment, determine a split of the braking torque between the at least two axles based on the braking power and brake state parameters of the at least one braking system on each of the at least two axles, allocate the braking torque between the at least two axles based on the split, and control the at least one braking system for each of the at least two axles based on the allocated braking torque.

16. The controller of claim 15, wherein the software is further configured to, in each of the one or more iterations, adjust the split based on braking control performed by another system.

17. The controller of claim 15, wherein the one or more iterations are a plurality of iterations, and wherein the software is further configured to, in at least one of the plurality of iterations, constrain a rate of change in a value of the split with respect to one or more prior ones of the plurality of iterations.

18. The controller of claim 15, further comprising a non-transitory computer-readable medium storing a split map thereon, wherein determining the split of the braking torque between the at least two axles comprises looking up a value of the split in the split map using the braking power and brake state parameters as inputs.

19. A mobile equipment comprising:
at least two axles, wherein each of the at least two axles has at least one braking system; and
the controller of claim 15.

20. A method comprising, by a controller in a mobile equipment that comprises at least two axles that each have at least one braking system, in each of a plurality of iterations:

determining braking torque based on a requested braking from a brake interface;

determining braking power based on the determined braking torque and a speed of the mobile equipment;

determining a split of the braking torque between the at least two axles based on the braking power and brake state parameters of the at least one braking system on each of the at least two axles;

adjusting the split based on braking control performed by another system;

stabilizing the split when a rate of change in the split with respect to one or more prior ones of the plurality of iterations would violate a constraint;

allocating the braking torque between the at least two axles based on the split; and controlling the at least one braking system for each of the at least two axles based on the allocated braking torque.

\* \* \* \* \*